US005969317A

United States Patent [19]

Espy et al.

[11] Patent Number: 5,969,317

[45] Date of Patent: Oct. 19, 1999

[54] PRICE DETERMINATION SYSTEM AND METHOD USING DIGITIZED GRAY-SCALE IMAGE RECOGNITION AND PRICE-LOOKUP FILES

[75] Inventors: Calvin L. Espy, Decatur; Jianzhong Huang, Snellville; John C. Ming, Acworth, all of Ga.; Antai Peng, Irvington, N.J.; Barry D. Briggs, Lilburn, Ga.

[73] Assignee: NCR Corporation, Dayton, Ohio

[21] Appl. No.: 08/748,440

[22] Filed: Nov. 13, 1996

[51] Int. Cl.[6] .......... G06K 9/46

[52] U.S. Cl. .......... 235/378; 235/383; 382/170; 382/203; 705/20; 705/23

[58] Field of Search .......... 235/378, 383, 235/385; 382/170, 177, 190, 203, 216; 705/20, 23

[56] References Cited

U.S. PATENT DOCUMENTS

| | | | |
|---|---|---|---|
| 4,490,848 | 12/1984 | Beall et al. | 382/121 |
| 4,777,651 | 10/1988 | McCann et al. | 382/21 |
| 4,783,828 | 11/1988 | Sadjadi | 382/21 |
| 4,791,482 | 12/1988 | Barry et al. | 358/107 |
| 4,961,231 | 10/1990 | Nakayama et al. | 382/21 |
| 4,977,502 | 12/1990 | Baker et al. | 364/405 |
| 5,007,098 | 4/1991 | Kumagai | 382/21 |
| 5,031,225 | 7/1991 | Tachikawa et al. | 382/21 |
| 5,050,222 | 9/1991 | Lee | 382/21 |
| 5,058,181 | 10/1991 | Ishihara et al. | 382/22 |
| 5,099,521 | 3/1992 | Kosaka | 382/6 |
| 5,426,282 | 6/1995 | Humble | 235/383 |
| 5,497,314 | 3/1996 | Novak | 364/403 |
| 5,546,475 | 8/1996 | Bolle et al. | 382/190 |

*Primary Examiner*—Donald Hajec
*Assistant Examiner*—Drew A. Dunn
*Attorney, Agent, or Firm*—Paul W. Martin; Peter H. Priest

[57] ABSTRACT

An item recognition system and method which is particularly suited for automating entry of items too small to carry readable bar code labels. The system includes a camera which digitizes the image to produce a digitized image and a gray-scale digitized image. A binary image of the gray-scale image is then produced from which the computer records an image of the item, and a computer coupled to the camera which digitizes the image to produce a digitized image and a gray-scale digitized image. A binary image of the gray-scale image is then produced from which the computer identifies the item from the binary image and obtains the price from a price-lookup file.

13 Claims, 9 Drawing Sheets

PRICE DETERMINATION SYSTEM AND METHOD USING DIGITIZED GRAY-SCALE IMAGE RECOGNITION AND PRICE-LOOKUP FILES

BACKGROUND OF THE INVENTION

The present invention relates to object identification systems, and more specifically to an item recognition system and method.

Readable bar code labels are difficult to impossible to attach to fasteners and other small unpacked items. For example, in a typical building supply store, a store clerk must identify small items by visually matching a customer-provided item to one of a plurality of sample items fastened to a sheet of cardboard, or by manually identifying the item in a blue-print book. The clerk reads an item number, such as a stock keeping unit (SKU) number, for the identified item from the cardboard sheet or blue-print book, and enters the item number into the transaction using a keyboard of a retail terminal. Alternatively, the clerk may scan the bar code next to a picture of the item in a book. These methods are time consuming and subject to error.

Most retailers realize that unpacked items increase check-out time. They tend to package most of the small items in boxes, forcing the customers to purchase the items in a quantity that sometimes is unnecessary and even wasteful.

Therefore, it would be desirable to provide a system and method that more quickly identifies an item and incorporate its item number into a transaction without the disadvantages above.

SUMMARY OF THE INVENTION

In accordance with the teachings of the present invention, an item recognition system and method is provided.

The system includes a camera which records an image of the item, and a computer coupled to the camera which identifies the item from the image and which obtains the price from a price-lookup file.

In one embodiment, the system includes an image processing computer coupled to the camera which identifies the item from the image, a transaction server coupled to the image processing server which obtains the price from a price-lookup file, and a transaction terminal coupled to the transaction server and located in proximity with the camera which completes a transaction using the price information.

The system may further include a plurality of additional transaction terminals coupled to the transaction server and a plurality of additional cameras located in proximity with the additional transaction terminals for producing a plurality of additional images. In such a system, each camera preferably includes an operator switch for signaling the image processing server to activate the camera and for identifying the transaction terminal associated with the camera. The image processing server controls processing of images from individual cameras through a multiplexor.

The method of obtaining a price of an item is based upon an analysis of features extracted from a captured image of the item. A parsing algorithm identifies the item from corresponding features in a feature database. The image processing server determines an identification number for the item from the feature database. The transaction server obtains the price from a PLU file and forwards it to the terminal associated with a requesting camera.

It is accordingly an object of the present invention to provide an item recognition system and method.

It is another object of the present invention to provide an item recognition system and method that identifies items that are too small to carry readable bar code labels.

It is another object of the present invention to provide an item recognition system and method that improves check-out speeds for transactions involving items that are too small to carry readable bar code labels.

It is another object of the present invention to provide an item recognition system and method that is feature-based.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1A:
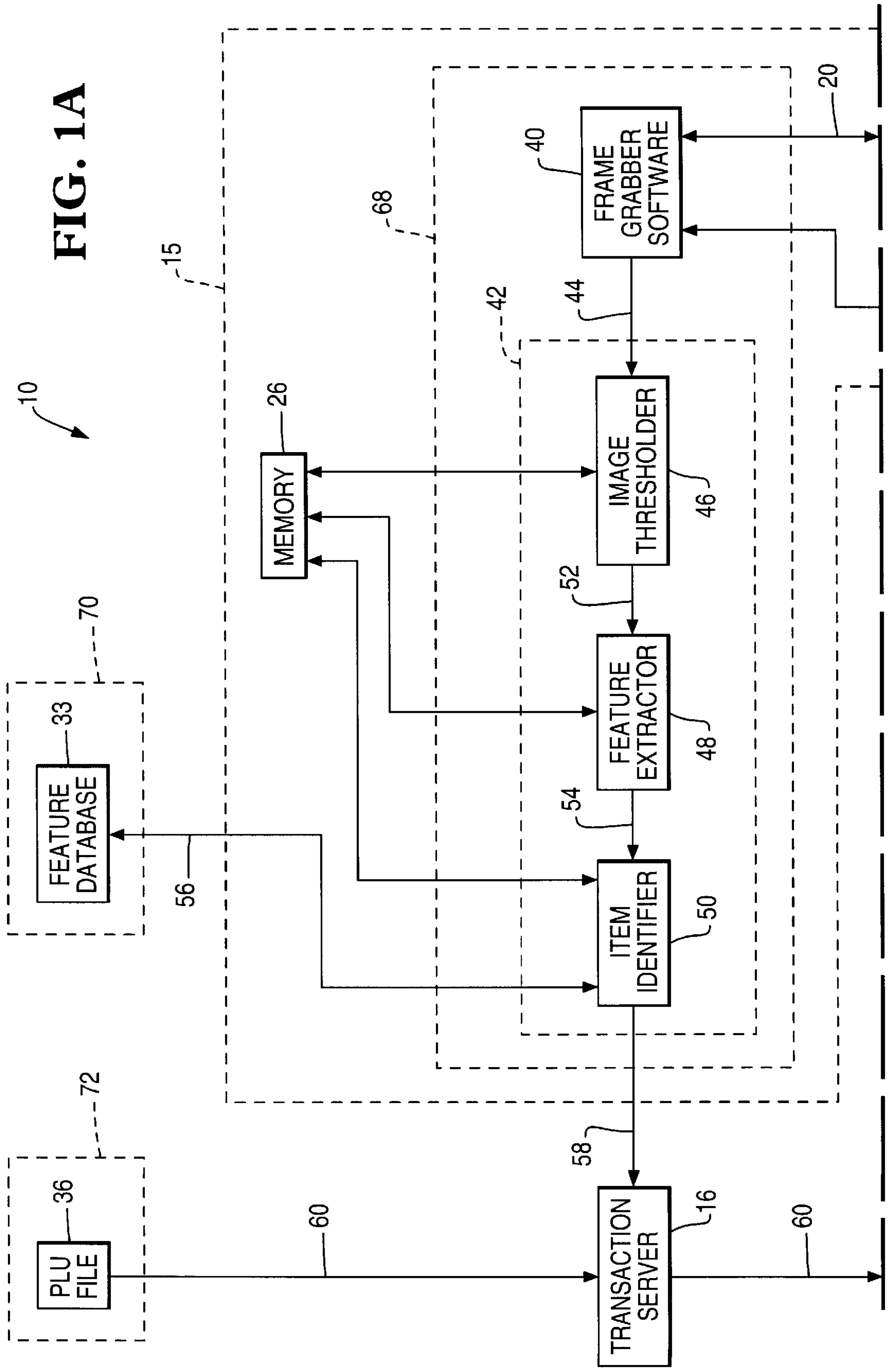
FIGS. 1A and 1B form a block diagram of the item recognition system of the present invention.
Figure 1B:
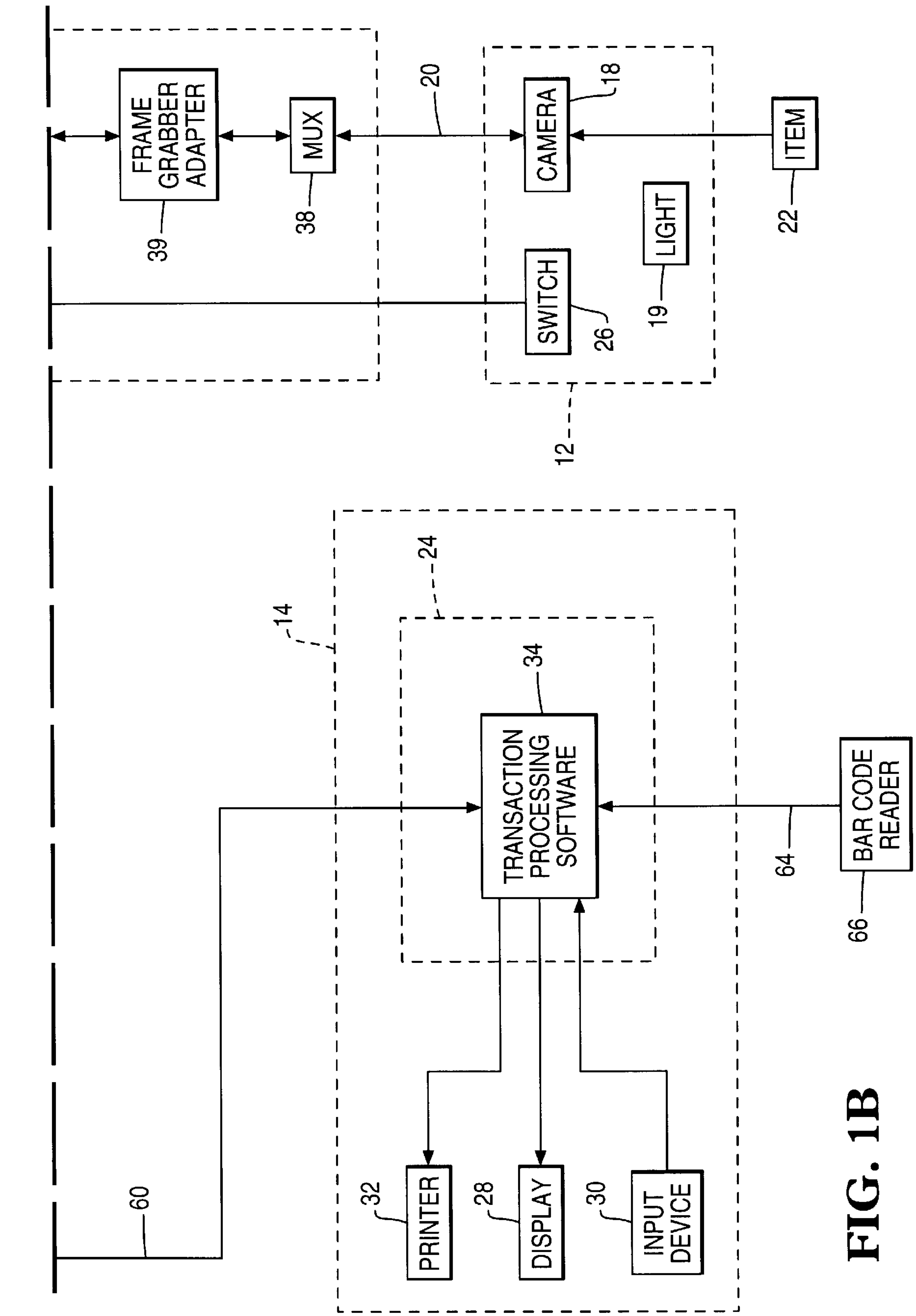

Referring now to FIG. 1, system 10 primarily includes camera assembly 12, terminal 14, image processing server 15, and transaction server 16. System 10 may also include additional peripherals, including bar code reader 66.

Camera assembly 12 includes camera 18 and light 19. Camera 18 is preferably a commercially available charge-coupled device (CCD) camera, such as one produced by Sensormatic, Inc., which records pixel images 20 of item 22 and which signals image processing server with information identifying the terminal associated with camera 18. Camera 18 includes a focal plane array consisting of a two-dimensional array of pixels. Camera 18 is preferably used in combination with bar code reader 66, due to the processing limitations of terminal 14, but on more powerful systems, it may be used without bar code reader 66 to capture images of items with and without bar code labels.

Camera assembly 12 further includes switch 26. When engaged, switch 26 sends a TERMINAL ID for the associated POS terminal 14 and a recognition request to image processing server 15.

Server 15 returns a "start" signal to activate camera 18. Light 19 illuminates item 22.

Preferably, a plurality of camera assemblies 12 is located throughout the transaction establishment. Video data cables and a control cable from each camera assembly 12 are multiplexed by multiplexor 38 into a frame grabber adapter card 39 within image processing server 15. Frame grabber adapter card 39 digitizes the images 20 from cameras 18.

Terminal 14 includes processor 24, display 28, input device 30, and printer 32, although known additions, deletions, and substitutions to this configuration are also envisioned within the meaning of the word "terminal".

Processor 24 executes transaction processing software 34 to support transaction processing. For example, transaction processing software 34 obtains the prices of all merchandise items, including prices of item 22 identified by camera 18, from a price look-up (PLU) file 36 associated with transaction server 16. Transaction processing software 34 tallies the prices of the items and directs printer 32 to print a receipt to complete the transaction.

Input device 30 is preferably a keyboard.

Bar code reader 66 reads bar code labels on items having bar code labels. Preferably, bar code reader 66 is an optical bar code reader. Bar code reader 66 returns a SKU number 64 to processor 24.

Image processing server 15 processes images 20. Processor 68 executes frame grabber software 40 and image processing software 42. Frame grabber software 40 is a driver that controls camera 18, produces gray-scale image 44 from pixel image 20, and stores gray-scale image 44 in memory 26.

Image processing software 42 includes image thresholder 46, feature extractor 48, and item identifier 50.

Image thresholder 46 converts gray-scale image 44 from frame grabber software 40 to binary image 52 using well-known algorithms. If the pixel gray level is greater than the threshold value, the pixel is assigned a pixel value of "1", otherwise it is assigned a pixel value of "0". Binary image 52 is a compacted version of the original pixel images 20, since every eight original gray-scale pixels (eight bytes) are now packed in one byte with one bit representing one pixel.

Feature extractor 48 extracts features 54 from binary image 52. In this context, features 54 are defined as something that can be numerically computed from binary image 52, either directly or indirectly.

Features 54 include both direct and indirect features. Features 54 are direct features if they can be extracted directly from binary image 52. For example, the shaft length and shaft radius of a nail are considered direct features. Usually, the indirect features pertain to some mathematical properties that make different items easier to distinguish than by using the direct features alone. For example, where both a cement nail and a flat head nail may have a similar head width or head radius, the two nails can be distinguished by comparing the ratio of head width to head radius for the two nails. This ratio is used as an indirect feature and shows that the ratio from the cement nail is larger than the ratio from the common flat head nail.

A small item usually possesses several features that can be used later on in the identification process. For example, the nail has a boundary (contour shape), shaft length, shaft radius, head width, and head radius. A washer has different features, namely first and second boundaries, outer and inner boundary radii, co-centered first and second boundaries, and circular first and second boundaries.

Feature extractor 48 provides an array of features 54 that represent item 22. At this point, binary image 52 no longer contains any useful information and can be discarded from memory 26 if memory 26 is limited in size. Since storing an image usually requires a large memory space, it is not practical to continuously operate on binary image 52.

Feature extractor 48 provides useful information regarding binary image 52 in a more compact format. In addition to using less of memory 26, features 54 are easier to work with.

Item identifier 50 executes a parsing algorithm that compares features 54 to features stored in feature database 33 to identify item 22 and produce a SKU number output 58. Item identifier 50 sends the SKU number and the identity of the terminal associated with the camera producing image 20 to transaction server 16.

Memory 26 stores software, gray-scale image 44, binary image 52, features 54, output 58, and reference features 56.

Storage medium 70 stores feature database 33 and is preferably a fixed disk drive. Feature database 33 contains reference features 56 on items 22 within a transaction establishment.

Transaction server 16 processes requests for price information from terminal 14 and image processing server 15. Transaction server 16 receives SKU numbers from image processing server 15 and from terminal 14. Transaction server 16 reads PLU file 36 and transmits corresponding price information to terminal 14. Image processing server 15 sends information identifying the terminal associated with the camera in use so that transaction server 16 may route the SKU numbers to that terminal.

Transaction server 16 includes storage medium 72, which stores PLU file 36. Storage medium 72 is preferably a fixed disk drive.

Terminal 14, image processing server 15, and transaction server 16 are preferably part of a network and linked in a known manner. Of course, image processing server 15 and transaction server 16 may be the same computer.

Figure 6:
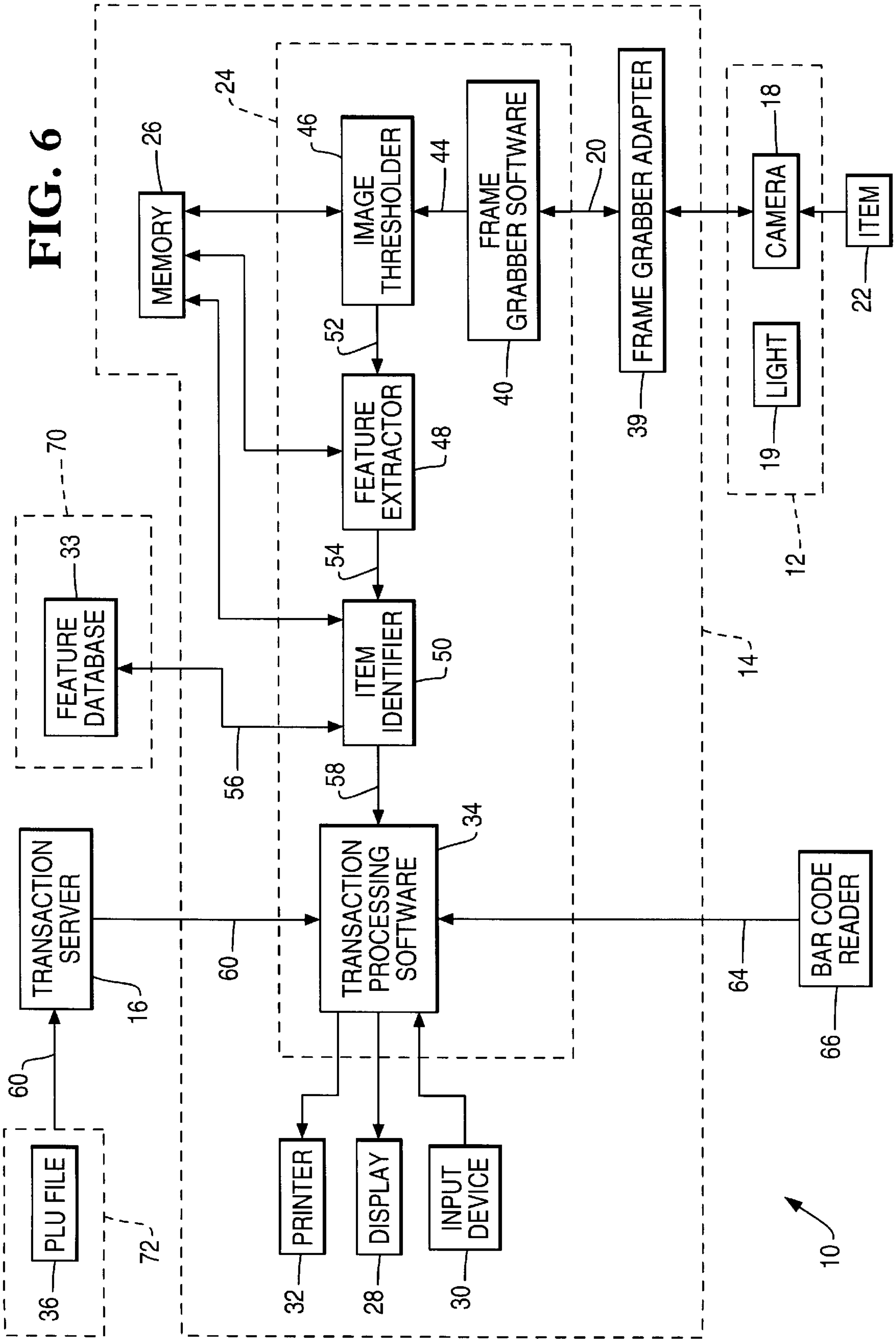
FIG. 6 is a block diagram of an alternative embodiment of the item recognition system of the present invention.

With reference to FIG. 6, image processing server 15 may be eliminated and the functions of image processing server 15 may be executed instead by terminal 14. For example, frame grabber card 39 may include a digital signal processor or other processing circuitry to manage image processing chores within terminal 14. Operation of camera 18 may be started by a user by striking a key on terminal 14 or by engaging a button on camera 18. This example would avoid the need to multiplex image camera connections and the need to send a terminal address with an image processing request.

In addition, any of the above computers may use image compression as necessary to speed transfer and processing of images. For example, an item image may be captured by camera 18, digitized and compressed by a digital signal processor or state machine, and then sent to terminal 14 for analysis.

Finally, other methods of identifying items may be used in conjunction with the system of the present invention. Thus, the system may additionally include a small scale and/or an electromagnet. The scale does not have to be very precise, since it is intended to be used to compare the weight when the electromagnet is on and off to determine whether the object is magnetic or not. This enables the device to recognize the difference between steel and aluminum screws. A switchable filter might be necessary to do a primitive color filtering comparison to resolve the difference between aluminum and brass since both are not magnetic.

Once it identifies item 22, item identifier 50 sends the SKU number to transaction processing software 34.

An alternative processing method involves the use of a chain code to represent a boundary of item 22. A chain code is a connected sequence of straight line segments. Their use in digital image processing is well-known in the art. See for example, "Digital Image Processing", by Rafael C. Gonzalez and Paul Wintz, Chapter 8.1.1, pages 392–395. This reference is hereby incorporated by reference. Once terminal 14 has determined a chain code representing the boundary of item 22, terminal 14 may then compare the chain code to previously stored chain codes in a chain code database.

Figure 2:
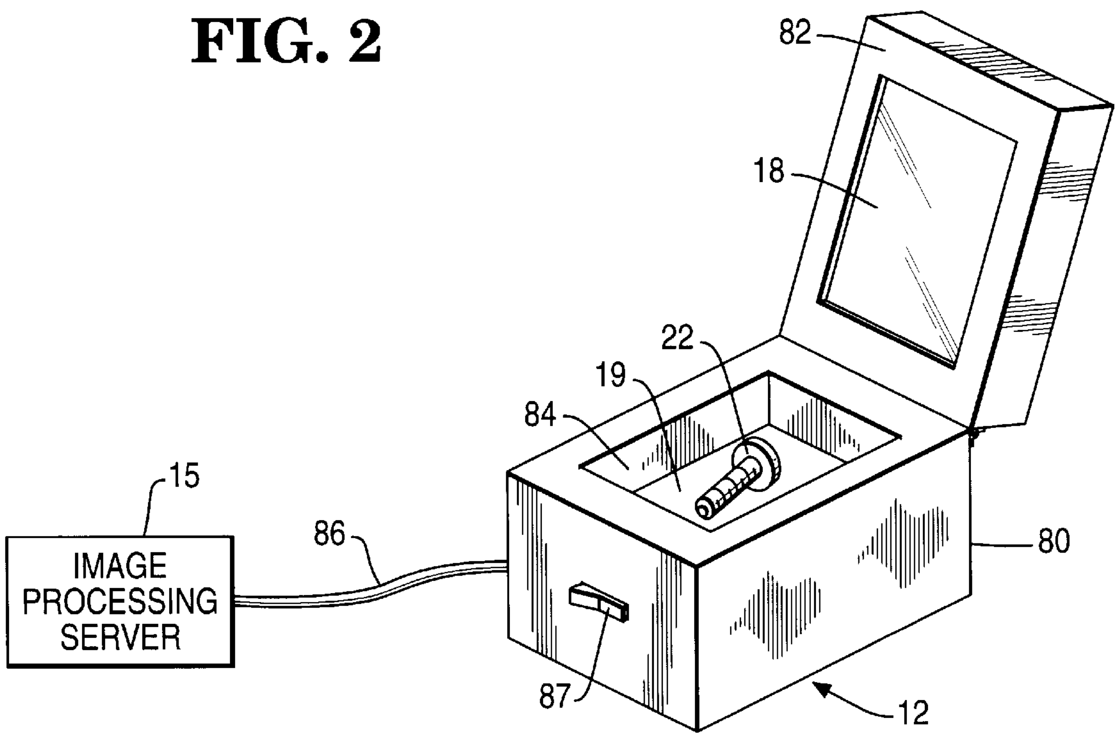
FIG. 2 is a perspective view of a camera assembly.

Turning now to FIG. 2, camera assembly 12 is shown in more detail. Cable assembly 12 couples to image processing server 15 through cable 86. Cable 86 includes individual image and control lines.

Camera assembly 12 includes base portion 80 and lid portion 82. Base portion 80 contains cavity 84.

Lid 82 contains camera 18 and is hinged to base portion 80.

If camera 18 is a CCD camera, then light 19 is mounted at the bottom of the box, just under the part to be recognized. Of course, there may be other configurations based upon the type of camera system.

Camera assembly 12 includes button 87 which controls switch 26.

Figure 3A:
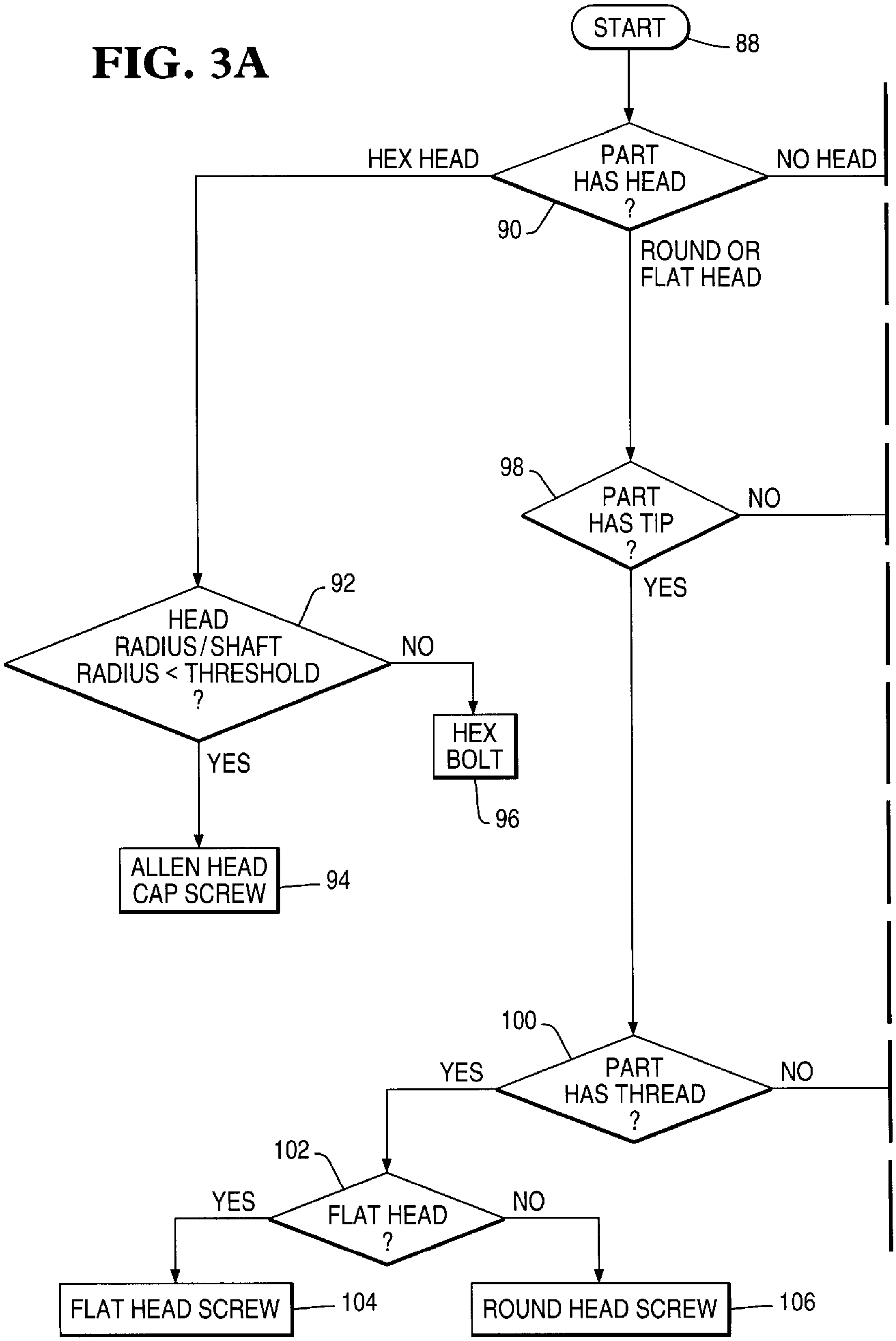
FIGS. 3A and 3B form an example of a parsing diagram for single-boundary items used by the recognition system.
Figure 3B:
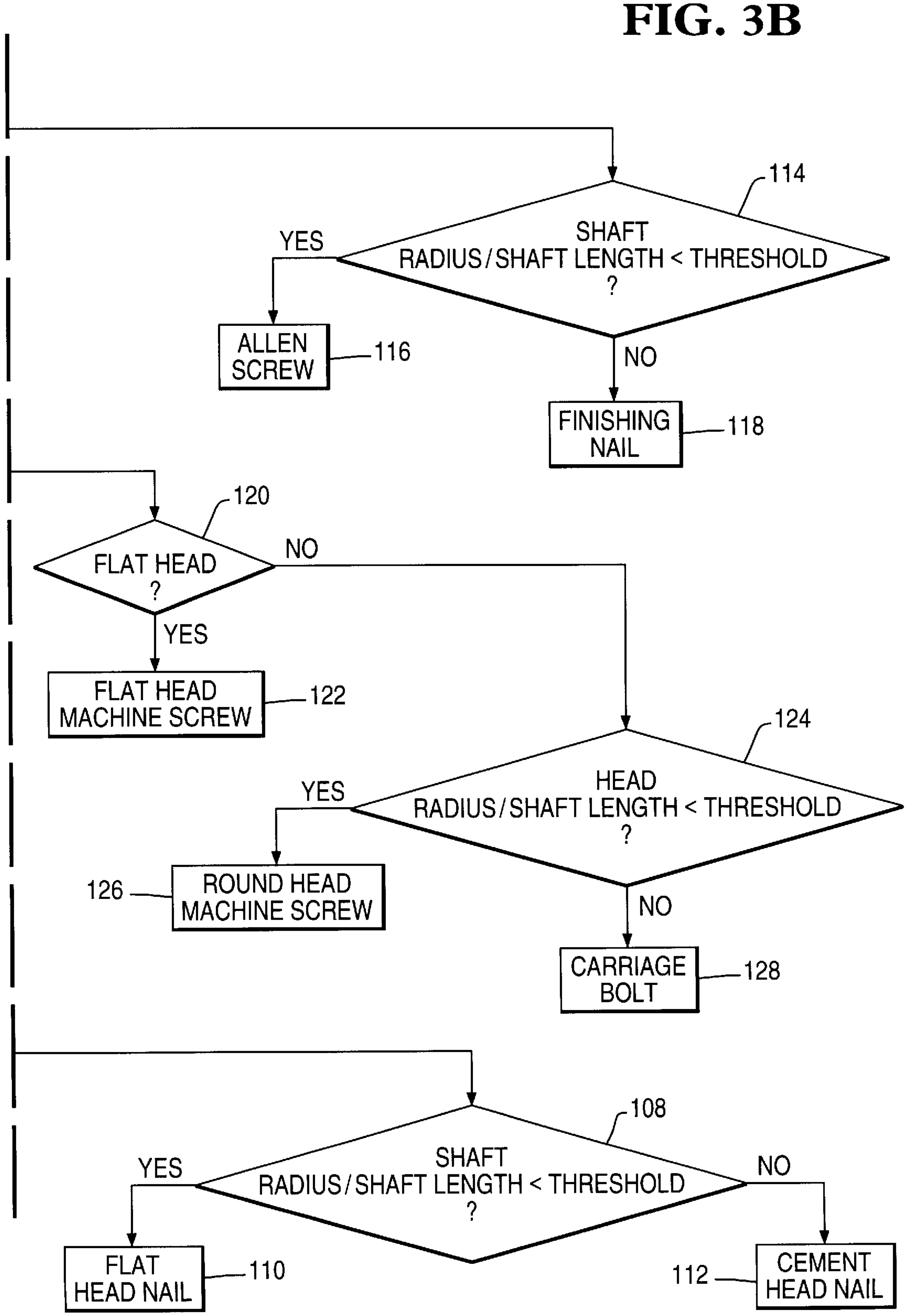

With reference to FIGS. 3A and 3B, a parsing diagram for one boundary item is shown beginning with step 88. Using this parsing diagram, item identifier 50 is able to identify parts including an allen head cap screw 94, hex bolt 96, flat head screw 104, round head screw 106, flat head nail 110, cement nail 112, flat head machine screw 122, round head machine screw 126, carriage bolt 128, allen screw 116, and finishing nail 118. Of course, this parsing diagram is illustrative of the process. Other items may also be identified with similar parsing diagrams.

Parts 104, 106, and 122 may be identified using only direct features. However, parts 94, 96, 110, 112, 116, 118, 126, and 128 may be identified if indirect features are examined.

Direct features are represented in steps 90, 98, 100, 102, and 120. In step 90, the parsing algorithm determines whether a part has a head and the type of head: hex or allen, or round or flat. Step 98 determines whether a round or flat-headed part has a tip. Step 100 determines whether a round or flat-headed part with a tip has a thread. Step 102 determines whether the round or flat-headed part with a tip and a thread has a flat head. Finally, step 120 determines whether a round or flat-headed part without a tip has a flat head.

Indirect features are represented in steps 92, 108, 114, and 124. In step 92, the parsing algorithm determines whether a part with a hex or allen head has a head radius to shaft radius ratio less than a predetermined threshold. If it does, the part is an allen head cap screw 94. If it does not, the part is a hex bolt 96.

In step 108, the parsing algorithm determines whether a part with a round or flat head and a tip but no thread has a shaft radius to shaft length ratio less than a predetermined threshold. If it does, the part is a flat head nail 110. If it does not, the part is a cement nail 112.

In step 114, the parsing algorithm determines whether a part without a head has a shaft radius to shaft length ratio less than a predetermined threshold. If it does, algorithm 100 checks whether the part has threads; if it has, the part is an allen screw 116; otherwise, it is a pin 115. On the other hand, if the shaft radius to shaft length ratio is not less than the threshold, the part is a finishing nail 118.

Finally, in step 124, the parsing algorithm determines whether a part with a round head and no tip has a head radius to shaft length ratio less than a predetermined threshold. If it does, the part is a round head machine screw 126. If it does not, the part is a carriage bolt 128.

Figure 4A:
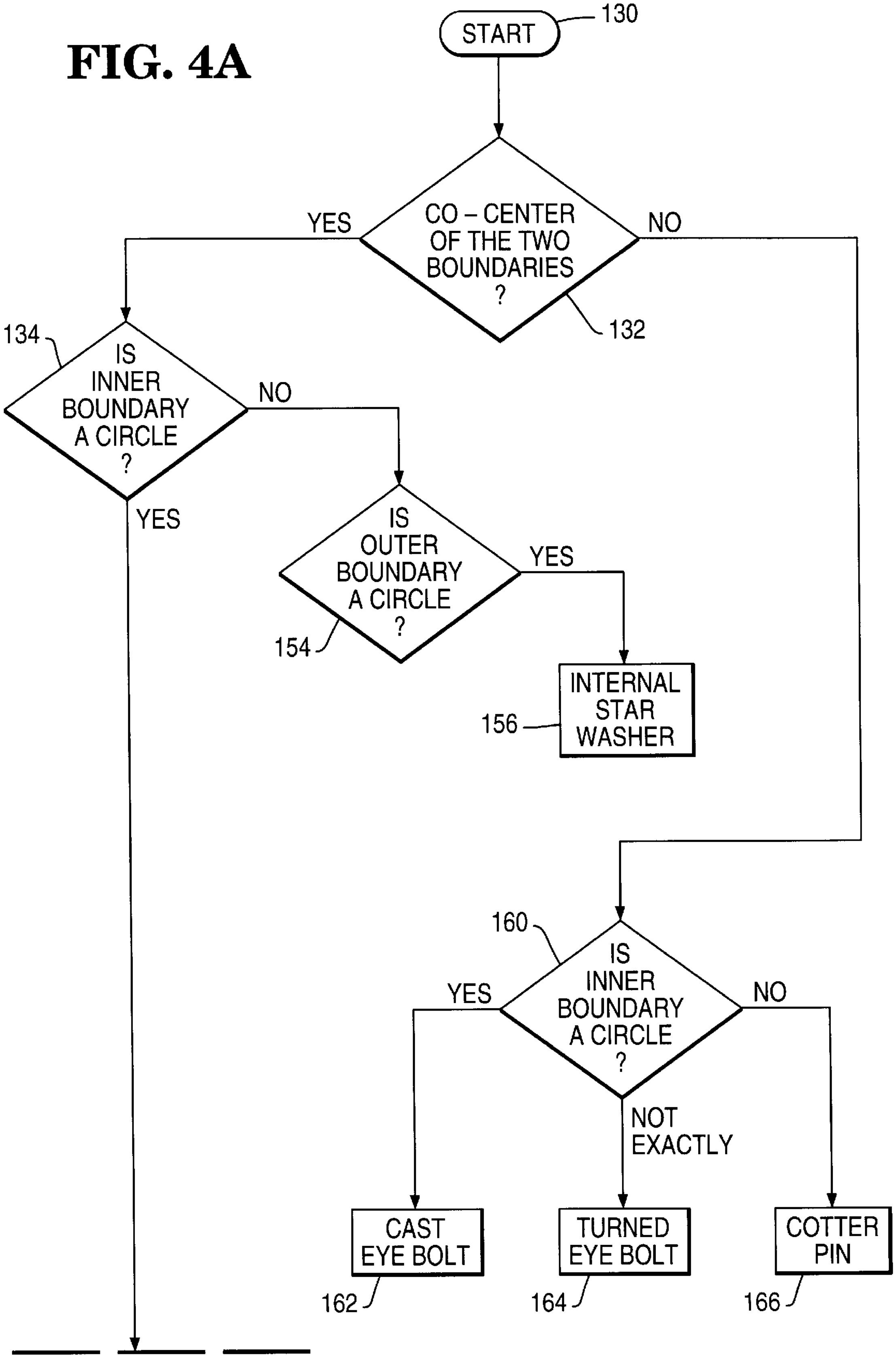
FIGS. 4A and 4B form an example of a parsing diagram for two-boundary items used by the recognition system.
Figure 4B:
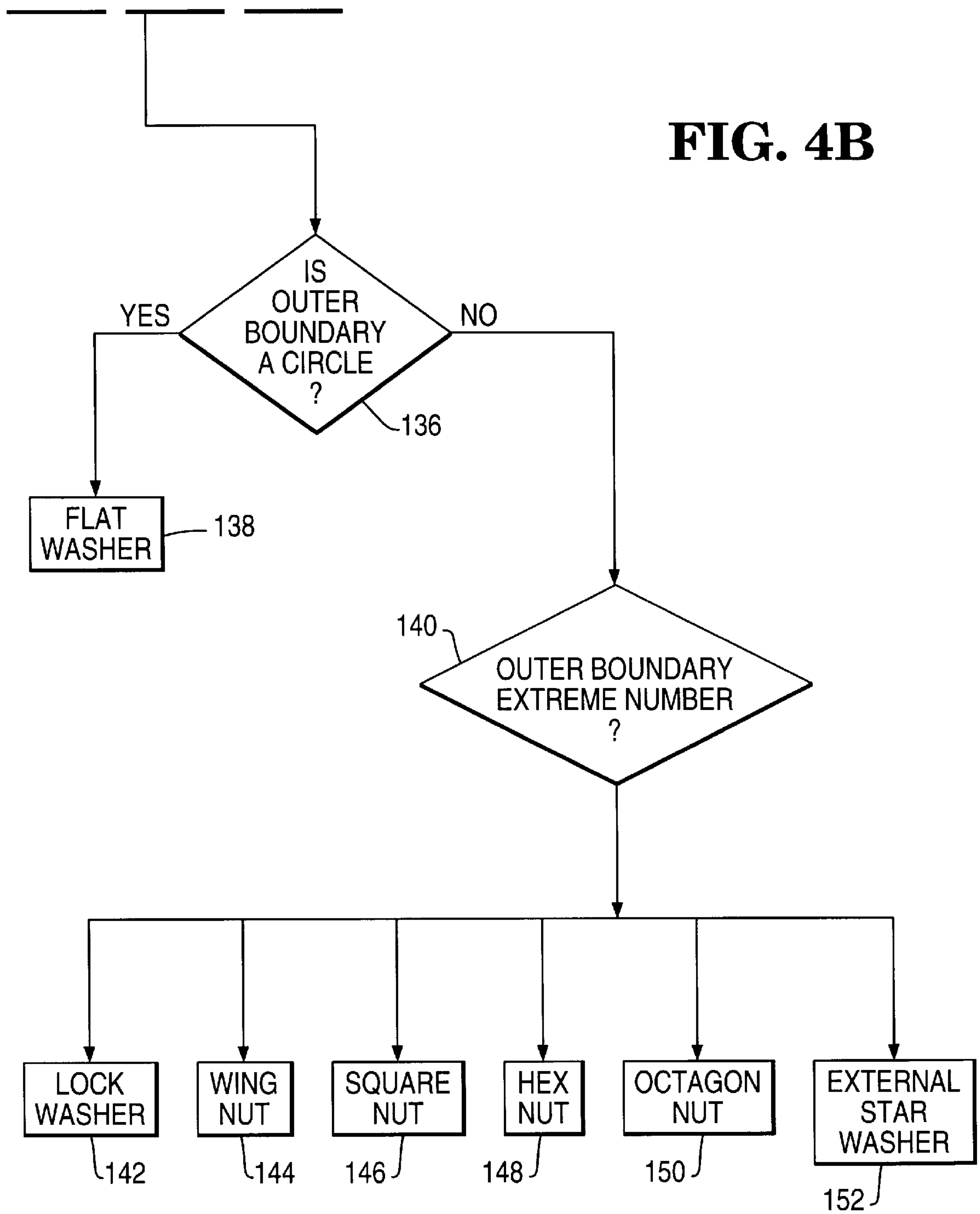

With reference to FIGS. 4A and 4B, a parsing diagram for two-boundary items is shown beginning with START 130. Using this parsing diagram, item identifier 50 is able to identify parts including a flat washer 138, a lock washer 142, a wing nut 144, a square nut 146, a hex nut 148, an octagon nut 150, an external star washer 152, an internal star washer 156, a cast eye bolt 162, a turned eye bolt 164, and a cotter pin 166. Of course, this parsing diagram is illustrative of the process. Other items may also be identified with similar parsing diagrams.

Parts 138, 156, 162, 164, and 166 may be identified using only direct features. However, parts 142–152 may be identified if indirect features are examined as well.

Direct features are represented in steps 132, 134, 136, 154, and 160. In step 132, the parsing algorithm determines whether the two boundaries are co-centered. Steps 134 and 160 determine whether the inner boundary is a circle. Steps 136 and 154 determine whether the outer boundary is a circle.

Thus, if item 22 has two co-centered boundaries and the inner and outer boundaries are both circles, then the parsing algorithm identifies item 22 as a flat washer 138.

If item 22 has two co-centered boundaries, but only the outer boundary is a circle, then the parsing algorithm identifies item 22 as an internal star washer 156.

If item 22 does not have two co-centered boundaries, but the inner boundary is a circle, then the parsing algorithm identifies item 22 as a cat eye bolt 162.

If item 22 does not have two co-centered boundaries, and the inner boundary is not a circle, then the parsing algorithm identifies item 22 as a cotter pin 166.

Indirect features are represented in steps 140 and 160. In step 140, the parsing algorithm determines the number of extremes of the outer boundary from the center of the item. In step 160, the parsing algorithm determines the closeness of the inner boundary to a circle.

Thus, if item 22 does not have two co-centered boundaries, and the inner boundary is almost a circle, then the parsing algorithm identifies item 22 as a turned eye bolt 164.

If item 22 has two co-centered boundaries and only the inner boundary is a circle, then the parsing algorithm examines the extreme count to identify item 22. If the extreme count is less the two, the parsing algorithm identifies item 22 as lock washer 142. If the extreme count is two, the parsing algorithm identifies item 22 as wing nut 144. If the extreme count is four, the parsing algorithm identifies item 22 as square nut 146. If the extreme count is six, the parsing algorithm identifies item 22 as hex nut 148. If the extreme count is eight, the parsing algorithm identifies item 22 as octagon nut 150. If the extreme count is greater than eight, the parsing algorithm identifies item 22 as an external star washer 152.

Figure 5:
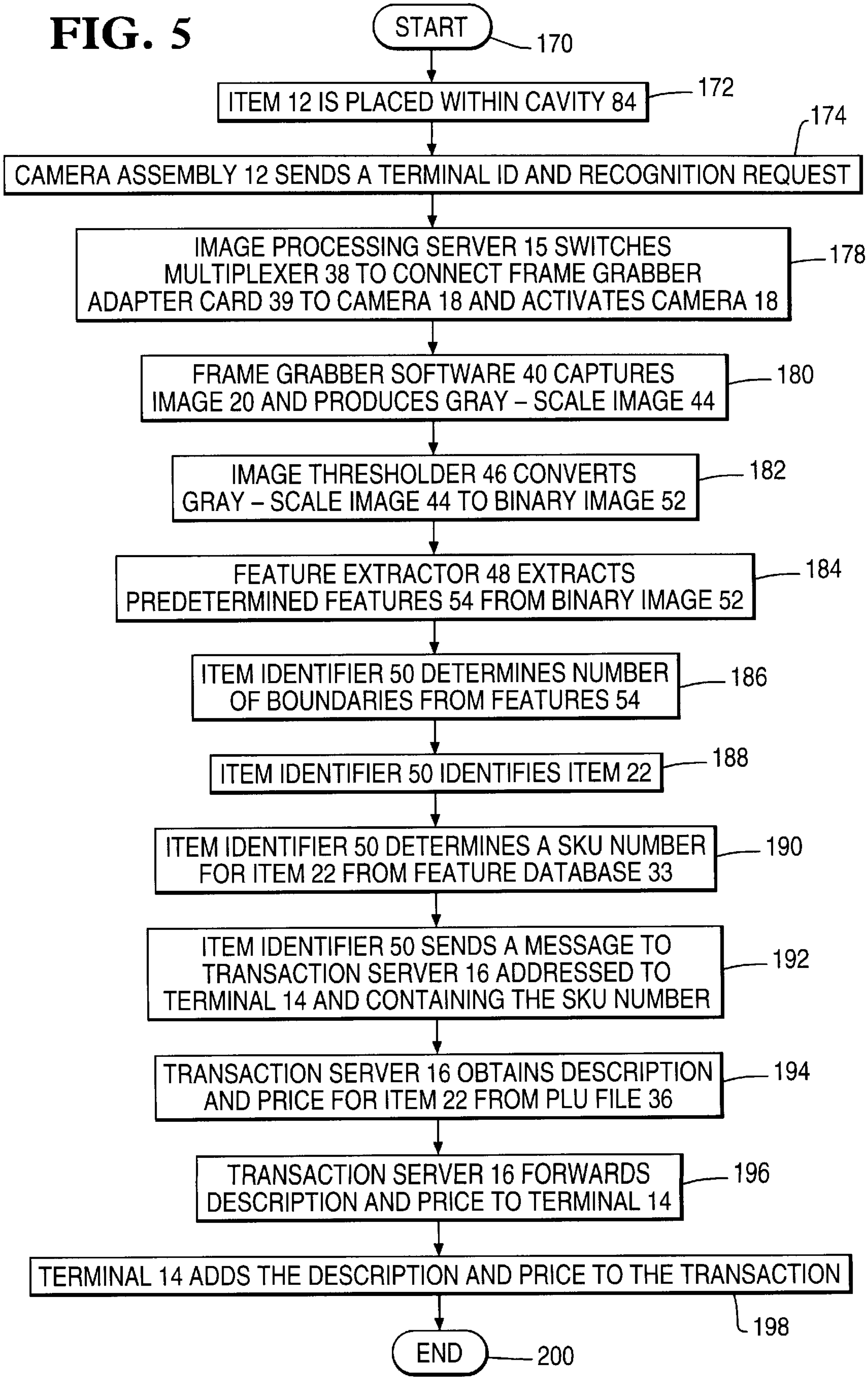
FIG. 5 is a flow diagram illustrating the operation of the system in FIG. 1.

With reference to FIG. 5, the operation of system 10 is described in detail beginning with START 170.

In step 172, a clerk places item 22 within cavity 84 and closes lid portion 82.

In step 174, camera assembly 12 sends a terminal ID and request for item recognition to image processing server 15 upon engagement of switch 26 by the clerk.

In step 178, if image processing server 15 is available, it switches multiplexor 38 to connect frame grabber adapter card 39 to the camera 18 associated with the POS terminal 14 having the sent terminal ID and activates camera 18.

In step 180, frame grabber software 40 captures pixel image 20 and produces gray-scale image 44.

In step 182, image thresholder 46 converts gray-scale image 44 to binary image 52.

In step 184, feature extractor 48 extracts predetermined features 54 from binary image 52.

In step 186, item identifier 50 determines whether item 22 has one or two boundaries from features 54.

In step 188, item identifier 50 executes the parsing algorithm of FIGS. 3A and 3B for a single-boundary item or the parsing algorithm of FIGS. 4A and 4B for a two-boundary item to identify item 22 from features 54.

During this step, item identifier 50 preferably converts features 54 to descriptions that are more familiar to ordinary people. This is because the direct features are measured in pixels, while the items in a hardware store are normally measured in inches or centimeters and rounded to some specific values, such as 1/16", 1/8", 1/4", 1/2", etc.

The direct features may also vary by a predetermined amount about a standard value. Therefore, item identifier 50 preferably creates a look-up table to convert part sizes from pixels to inches and quantize sizes to standard sizes. For instance, the following look-up table converts feature information for a cement nail 112:

Look-up Table

| Shaft Length Range | Standard Shaft Length | SKU Number |
|---|---|---|
| 3.2–3.3 in. | 3.25 in. | 111111 |
| 4.25–4.75 in. | 4.5 in. | 222222 |
| 5.5–6.5 in. | 6 in. | 333333 |

In step 190, item identifier 50 determines a SKU number for item 22 from feature database 33. For items having various sizes or dimensions, item identifier 50 compares the determined dimension of item 22 to values in a lookup table. In the example above, item identifier 50 compares the length of cement nail 112 determined from binary image 52 to each of the three standard shaft lengths in the table to determine which of the three SKU numbers to report to transaction server 16.

In step 192, item identifier 50 sends a message addressed to the terminal 14 associated with the TERMINAL ID and containing the SKU number to transaction server 16.

In step 194, transaction server 16 obtains a description and price for item 22 from PLU file 36.

In step 196, transaction server 16 forwards the description and the price for item 22 to terminal 14.

In step 198, terminal 14 adds the description and price to the transaction.

In step 200, the method ends.

Although the present invention has been described with particular reference to certain preferred embodiments thereof, variations and modifications of the present invention can be effected within the spirit and scope of the following claims.

What is claimed is:

1. A system for determining the price of an item, the system comprising:

- a camera which records an image of the item;
- a frame grabber which digitizes the image to produce a digitized image and produces a gray-scale image of the digitized image;
- an image thresholder which produces a binary image of the gray-scale image;
- a feature extractor which extracts at least one feature from the binary image;
- a feature database which contains a plurality of reference items and each reference item is described by at least one reference feature;
- a price-lookup file which contains a price for each of the plurality of reference items; and
- a computer which compares the at least one feature with the reference features, identifies the item as matching one of the reference items, and obtains the price of the item from the price-lookup file.

2. The system of claim 1 wherein the at least one feature comprises an indirect feature.

3. The system of claim 2 wherein the indirect feature is derived from at least two direct features.

4. The system of claim 1 wherein the at least one feature comprises a direct feature.

5. The system of claim 4 wherein the direct feature comprises a contour shape.

6. The system of claim 1 further comprising:

- a transaction server coupled to the computer; and
- at least one transaction terminal coupled to the transaction server.

7. The system of claim 1 further comprising:

- a plurality of additional cameras for producing a plurality of additional images of additional items; and
- a multiplexor which selectively connects one of the cameras to the frame grabber.

8. A method of obtaining a price of an item comprising the steps of:

- sending a first message identifying a transaction terminal and including a request for item recognition to an image processing server;
- switching a multiplexor to connect a frame grabber adapter coupled to the image processing server to a camera associated with the transaction terminal;
- signaling the camera to record an image of the item by the image processing server;
- capturing the image by the camera;
- digitizing the image to produce a digitized image and a gray-scale digitized image;
- producing a binary image of the gray-scale image;
- extracting predetermined features from the binary image by the image processing server;
- executing a parsing algorithm to identify the item from corresponding features in a feature database by the image processing server;
- determining an identification number for the item from the feature database by the image processing server;
- sending a second message addressed to the transaction terminal and containing the identification number to a transaction server coupled to the transaction terminal;
- obtaining a description and the price for the item from a price-lookup file by the transaction server;
- forwarding the description and the price to the transaction terminal by the transaction server; and
- adding the description and price to the transaction by the transaction terminal.

9. A system for determining a price for an item comprising:

- a camera which records an image of the item;
- a frame grabber which digitizes the image to produce a digitized image and produces a gray-scale image of the digitized image;
- an image thresholder which produces a binary image of the gray-scale image;
- a feature extractor which extracts at least one feature from the binary image;
- a transaction terminal coupled to the camera which identifies the item from the at least one feature; and a transaction server coupled to the transaction terminal which obtains the price from a price-lookup file and returns it to the transaction terminal.

10. A method of determining a price for an item comprising the steps of:

recording an image of the item by a camera;

producing a digitized image of the image;

producing a grey-scale image of the digitized image;

producing a binary image of the grey-scale image; and identifying the item from extracted features of the binary image, including the substep of construction a chain code representing the item, and comparing the chain code to previously stored chain codes in a database; and obtaining a price associated with the item from a price-lookup file.

11. A system for determining the price of an item, the system comprising:

a camera which records an image of the item;

a frame grabber which digitizes the image to produce a digitized image and produces a gray-scale image of the digitized image;

an image thresholder which produces a binary image of the gray-scale image;

a feature extractor which extracts at least one direct feature from the binary image;

a feature database which contains a plurality of reference items and each reference item is described by at least one reference feature;

a price-lookup file which contains a price for each of the plurality of reference items;

a computer which:

generates at least one indirect feature from the at least one direct feature;

compares both the at least one direct feature and the at least one indirect feature with the reference features;

identifies the item as matching one of the reference items; and obtains the price of the item from the price-lookup file.

12. A system for determining the price of an item, the system comprising:

a camera which records an image of the item;

a frame grabber which digitizes the image to produce a digitized image and produces a gray-scale image of the digitized image;

an image thresholder which produces a binary image of the gray-scale image;

an apparatus which computes a chain code from the binary image;

a feature database which contains a plurality of reference items wherein each reference item is described by a reference chain code;

a price-lookup file which contains a price for each of the plurality of reference items; and a computer which compares the chain code with the reference chain codes, identifies the item as matching one of the reference items, and obtains the price of the item from the price-lookup file.

13. A method of obtaining a price of an item comprising the steps of:

capturing an image of the item by a camera;

producing a digitized image of the image;

producing a gray-scale image of the digitized image;

producing a binary image of the gray-scale image;

extracting at least one feature from the binary image;

executing a parsing algorithm to identify the item from a plurality of reference features in a feature database which contains a plurality of reference items and each reference item is described by at least one of the reference features;

determining an identification number for the item from the feature database; and obtaining the price from a price-lookup file.

* * * * *